Jan. 15, 1924. Re. 15,748

W. S. TOWNSEND ET AL

VISIBLE DISPLAY ATTACHMENT FOR MEASURING PUMPS

Original Filed June 12, 1922

Inventors:
Wm. S. Townsend
and Frank E. Douglass,
Geo H. Fearn
Att'y.

Reissued Jan. 15, 1924. Re. 15,748

UNITED STATES PATENT OFFICE.

WILLIAM S. TOWNSEND AND FRANK E. DOUGLASS, OF ROCHESTER, PENNSYLVANIA.

VISIBLE DISPLAY ATTACHMENT FOR MEASURING PUMPS.

Original No. 1,450,994, dated April 10, 1923, Serial No. 567,836, filed June 12, 1922. Application for reissue filed November 14, 1923. Serial No. 674,774.

*To all whom it may concern:*

Be it known that we, WILLIAM S. TOWNSEND and FRANK E. DOUGLASS, citizens of the United States, residing at Rochester, in the county of Beaver and State of Pennsylvania, have invented certain new and useful Improvements in Visible Display Attachments for Measuring Pumps, of which the following is a specification.

Our invention relates to dispensing apparatus.

The object of the invention is to provide an attachment particularly adapted for oil measuring and dispensing pumps; said attachment comprising a visible container which may first be filled only from the pump to display the oil to the purchaser; the visible container being kept filled and not emptied of its contents by the action of the pump.

Figure 1:
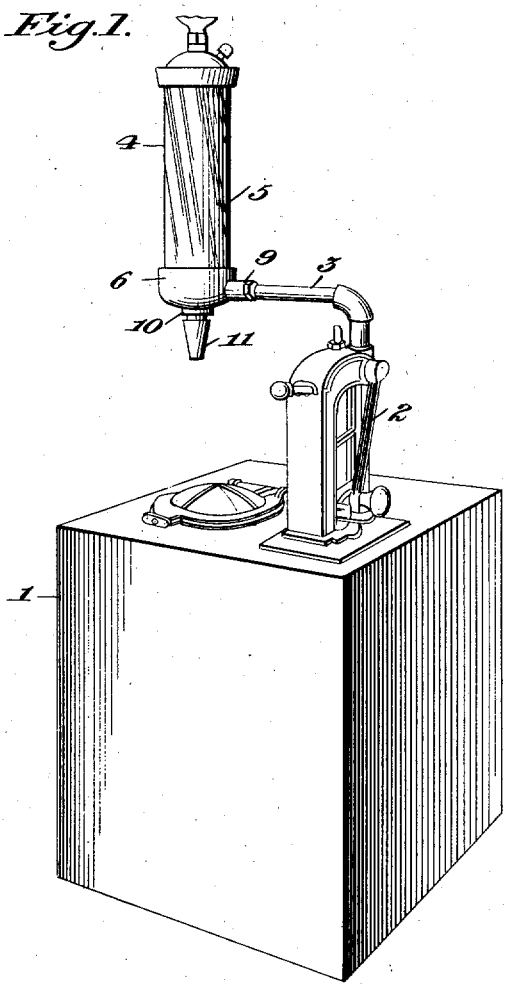
Fig. 1 is a perspective of an oil tank and measuring pump with our visible container attachment applied.
Figure 2:
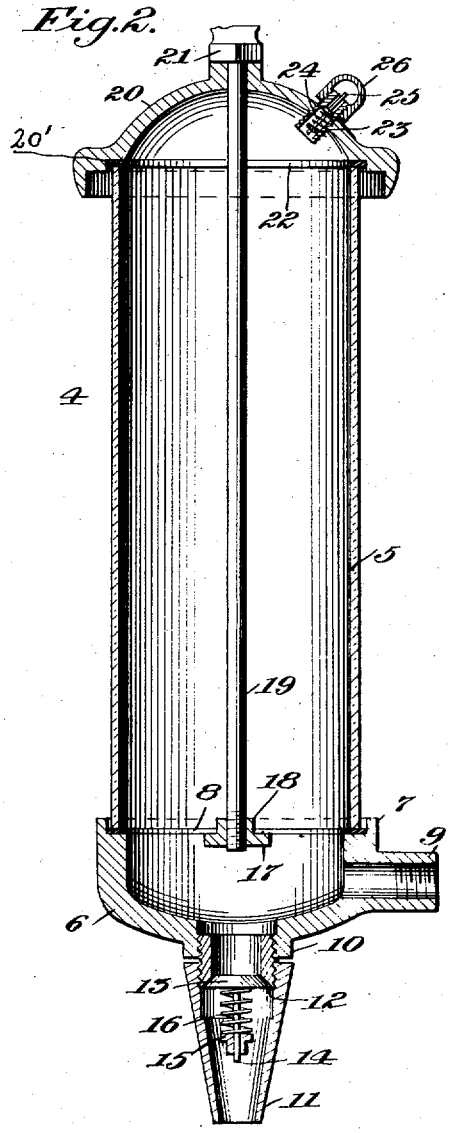
Fig. 2 is a vertical section of the visible container.

The supply tank is indicated at 1, and the pump 2 is mounted on top thereof and provided with a horizontal discharge pipe 3. The attachment 4 comprises a cylindrical glass container 5 closed at its lower end by a cup-like base 6 having a seat 7 and washer 8. The base 6 has a lateral inlet nipple 9 coupled to the discharge pipe 3 and an outlet nipple 10 in its bottom into which screws the threaded upper end of the discharge nozzle 11.

The discharge nozzle 11 is provided with a valve seat 12 and an upwardly closing check valve 13, the depending stem 14 of which passes through an apertured crossbar 15. A spring 16 mounted on the stem 14 between the valve 13 and the crossbar 15 holds the valve to its seat under normal conditions. The area of the discharge nozzle is thus restricted so that the liquid from the pump will be compelled to rise and fill the container.

Across the upper part of the cap 6 extends a crossbar or spider 17 having a central threaded boss 18 into which is threaded the lower end of a central rod 19, the upper end of which extends through a central opening in a cap or cover 20 and is provided with a suitable nut 21 so that the base 6 and cap 20 are secured firmly upon the ends of the visible container 5. The cap has an annular seat 21 and washer 22 for the upper end of the container so that it is airtight.

The cap or cover 20 is provided with an inwardly opening vent valve 23 normally closed by its spring 24 and provided with an exposed stem 25 preferably concealed by a screw cap 26. An ordinary tire valve will serve the purpose.

The operation is as follows: The operator first opens the vent valve 23 and then operates the measuring pump 2, whereupon the oil from tank 1 will flow through discharge pipe 3 and up into the glass container 5; the valve 13 remaining closed. As soon as the container 5 is filled the vent valve 23 will be released and closed by its spring. The contents of the container 5 will now be visible to prospective purchasers and must necessarily be of the same kind as that in the supply tank 1.

Having thus filled the visible container from tank 1, the oil pump 2 will thereafter fulfill its ordinary function of delivering a measured quantity of oil as per the sample in the visible container, since the force of the flow will open the outlet valve 13 and the pump pressure will, in connection with the closed vent valve 23 and pressure of the atmosphere, prevent the emptying of the visible container.

In other words, the glass container will always be filled with the same oil as that being measured and dispensed by the pump 2 and after having been once filled will not interfere with the flow of measured liquid from the pump 2.

Obviously, the construction may be variously modified without departing from the spirit of our invention.

What we claim is:

1. A visible display attachment for pumps, comprising a visible container having an inlet for connecting it with the discharge side of a pump, a closable vent to permit the container to be filled from the pump and then closed to prevent outflow of the contents, a discharge nozzle, and a normally closed outwardly opening discharge valve subject to the pressure from the inlet and past which the liquid may flow to the discharge nozzle without discharging the contents of the container.

2. A visible attachment for pumps, comprising a visible container provided with connected cap and base, a closable vent in the cap, in inlet in the base for connection with a pump outlet, a discharge nozzle, an upwardly closing check valve controlling said discharge nozzle and adapted to remain closed when the vent is opened for filling the container from the pump and during the cessation of flow through said inlet and to open only under the pressure exerted by liquid pumped through the inlet after the container has been first filled and its vent closed.

3. A visible display attachment for pumps, comprising a visible container having an inlet for connecting it with the discharge side of a pump, a normally closed vent to prevent outflow of the contents of the container when filled, means operable from the exterior of the container to open the vent to permit the filling of the container from the pump, a discharge nozzle, and a discharge valve past which, when open, the liquid may flow through the discharge nozzle without discharging the contents of the container.

4. A visible display attachment for pumps, comprising a visible container having an inlet for connecting it with the discharge side of a pump, a normally closed vent valve to allow, when opened, the escape of air as the container is being filled from the pump and preventing the escape of the liquid from the container when closed, and an outlet for the container having a restricted passage of less cross sectional area than said inlet, whereby in normal operation the container will be maintained full of liquid.

5. A visible display attachment for pumps, comprising a visible container having an inlet in its bottom for connecting it with the discharge side of a pump and an outlet also in the said bottom having a restricted passage of less cross sectional area than said inlet, and a normally closed vent valve in the upper end of the container which, when opened, will first allow the liquid retarded at the restricted outlet to rise and fill the container for display purposes and which, when closed, will cause the liquid to be held in the container while liquid is being forced by the pump from the inlet to the outlet for dispensing purposes.

In testimony whereof, we affix our signatures.

WILLIAM S. TOWNSEND.
FRANK E. DOUGLASS.